(12) United States Patent
Horibe et al.

(10) Patent No.: US 10,556,554 B2
(45) Date of Patent: Feb. 11, 2020

(54) MOUNTING STRUCTURE OF CAMERA

(71) Applicant: TOYODA GOSEI CO., LTD., Kiyosu-shi, Aichi-ken (JP)

(72) Inventors: Hitoshi Horibe, Kiyosu (JP); Takeshi Kondo, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/131,138

(22) Filed: Sep. 14, 2018

(65) Prior Publication Data

US 2019/0084494 A1 Mar. 21, 2019

(30) Foreign Application Priority Data

Sep. 20, 2017 (JP) ................... 2017-180363

(51) Int. Cl.
*B60R 11/04* (2006.01)
*B60R 11/00* (2006.01)

(52) U.S. Cl.
CPC ......... *B60R 11/04* (2013.01); *B60R 2011/004* (2013.01); *B60R 2011/0045* (2013.01)

(58) Field of Classification Search
CPC ...................................... B60R 11/04
USPC .......................................................... 348/148
See application file for complete search history.

(56) References Cited

U.S. PATENT DOCUMENTS

| 2009/0122141 | A1* | 5/2009 | Nakamura | ............. B60R 11/04 348/148 |
| 2011/0317015 | A1* | 12/2011 | Seto | ......................... B60R 1/00 348/148 |
| 2017/0001578 | A1* | 1/2017 | Buschmann | ............ B60R 11/04 |
| 2018/0013935 | A1* | 1/2018 | Kunze | ................. H04N 5/2252 |

FOREIGN PATENT DOCUMENTS

JP 2006-199065 A 8/2006

* cited by examiner

*Primary Examiner* — Patricia I Young
(74) *Attorney, Agent, or Firm* — Posz Law Group, PLC

(57) ABSTRACT

A mounting structure of a camera, includes: a camera configured to image an image corresponding to at least a part of surroundings of a vehicle; and a decorative member configured to be mounted on an exterior component of the vehicle and to cover the camera, wherein: the decorative member closely contacts the exterior component, and covers the camera in such a manner that the camera is not disturbed to image the image; and the camera is disposed in a region of an inside of the decorative member from an external surface of the decorative member.

8 Claims, 6 Drawing Sheets

MOUNTING STRUCTURE OF CAMERA

CROSS-REFERENCE TO RELATED APPLICATION(S)

This application is based upon and claims the benefit of priority from Japanese Patent Application No. 2017-180363, filed on Sep. 20, 2017, the entire contents of which are incorporated herein by reference.

BACKGROUND

1. Field of the Invention

The present invention relates to a mounting structure of a camera for monitoring, for example, a rear view of a vehicle.

2. Description of the Related Art

In the related art, for example, a mounting structure of a rear-view monitoring camera disclosed in JP-A-2006-199065 has been known as a mounting structure of this kind of a camera. The mounting structure of the rear-view monitoring camera is provided with the rear-view monitoring camera and a garnish member, all of which are disposed in a rear position of a vehicle body of an automobile.

The garnish member is a long member having an L-shape in a cross-sectional view. Further, the garnish member is screwed to a vehicle body panel partially constituting a rear-side part of the vehicle body. An opening that communicates a front surface side of the garnish member and a rear surface side thereof is formed on a lower wall of the garnish member. The rear-view monitoring camera is fixed to an engaging rib formed on the rear surface side of the garnish member, and a lower end part of the rear-view monitoring camera in which a lens is disposed protrudes toward an outside from the opening of the garnish member.

Meanwhile, in the mounting structure of the rear-view monitoring camera described above, the garnish member is screwed to the vehicle body panel, and the lower end part of the rear-view monitoring camera protrudes toward the front surface side (the outside) from the opening of the garnish member. Accordingly, the mounting structure thereof has drawbacks in that water enters from a gap between the garnish member and the vehicle body panel, such that the rear-view monitoring camera may be wet, and design characteristics of an exterior of an automobile may deteriorate.

SUMMARY

The present invention has been made in consideration of the aforementioned drawbacks of the related art. Further, the present invention has been made in an effort to provide a mounting structure of a camera that is capable of not only preventing design characteristics of an exterior of a vehicle from deteriorating, but also preventing the camera covered by a decorative member from being wet.

According to a first aspect of the present invention, there is provided a mounting structure of a camera, including: a camera configured to image an image corresponding to at least a part of surroundings of a vehicle; and a decorative member configured to be mounted on an exterior component of the vehicle and to cover the camera, wherein: the decorative member closely contacts the exterior component, and covers the camera in such a manner that the camera is not disturbed to image the image; and the camera is disposed in a region of an inside of the decorative member from an external surface of the decorative member.

According to the first aspect, since the camera does not protrude toward an outside of the decorative member, design characteristics of an exterior of a vehicle may be prevented from deteriorating. Further, since the decorative member closely contacts an exterior component, outside water from a gap between the decorative member and the exterior component may be prevented from entering into an inside of the decorative member. Therefore, the camera may be prevented from being wet. Accordingly, it may be possible not only to prevent the design characteristics of the exterior of the vehicle from deteriorating, but also to prevent the camera covered by the decorative member from being wet.

According to a second aspect of the present invention, in the mounting structure of the camera according to the first aspect, the camera may be disposed in the inside of the decorative member, and the decorative member may be a half-mirror structure.

According to the second aspect, it may be possible not only to image an image of an outside of the decorative member by using the camera, but also to prevent the camera from being seen from the outside.

According to a third aspect of the present invention, in the mounting structure of the camera according to the first aspect, a tip end part in which a lens is disposed in the camera may be fitted into a recessed part formed on an internal surface of the decorative member, and a portion corresponding to a viewing range of the camera in the decorative member may be transparent or translucent.

According to the third aspect, it may be possible to support the camera by the decorative member.

According to a fourth aspect of the present invention, in the mounting structure of the camera according to the first aspect, a tip end part in which the lens is disposed in the camera may be fitted into a through hole formed in the decorative member through a seal member, and an external surface of the lens may be flush with the external surface of the decorative member.

According to the fourth aspect, it may be possible not only to prevent a portion other than the lens in the camera from being wet, but also to clearly image the image of the outside of the decorative member by using the camera.

According to a fifth aspect of the present invention, in the mounting structure of the camera according to any one of the first to fourth aspects, the exterior component may be formed with a communication hole through which an inside of the exterior component and the inside of the decorative member are communicated with each other.

According to the fifth aspect, air permeability in the inside of the decorative member may be secured.

According to the present invention, it may be possible not only to prevent the design characteristics of the exterior of the vehicle from deteriorating, but also to prevent the camera covered by the decorative member from being wet.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

A mounting structure of a camera according to an exemplary embodiment will be described more fully hereinafter with reference to the accompanying drawings.

Figure 1:
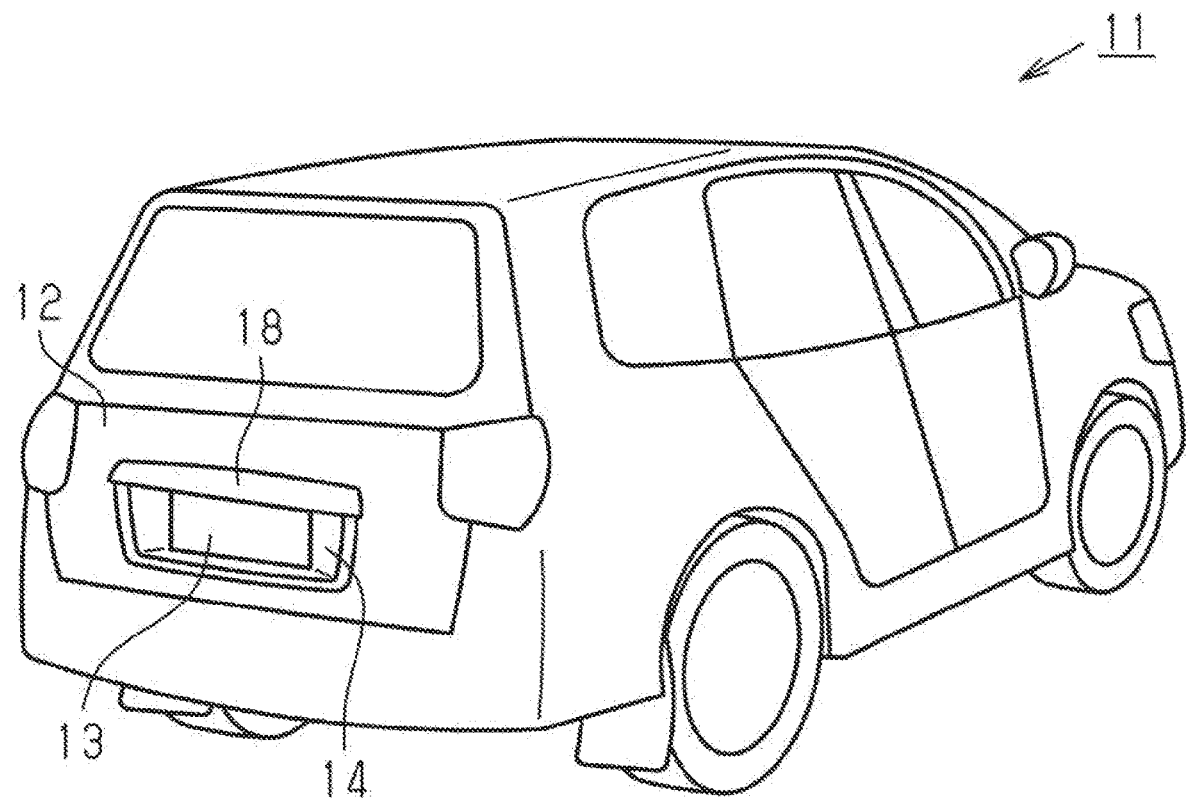
FIG. 1 is a perspective view illustrating a vehicle when viewed from a rear side according to a first exemplary embodiment.
Figure 2:
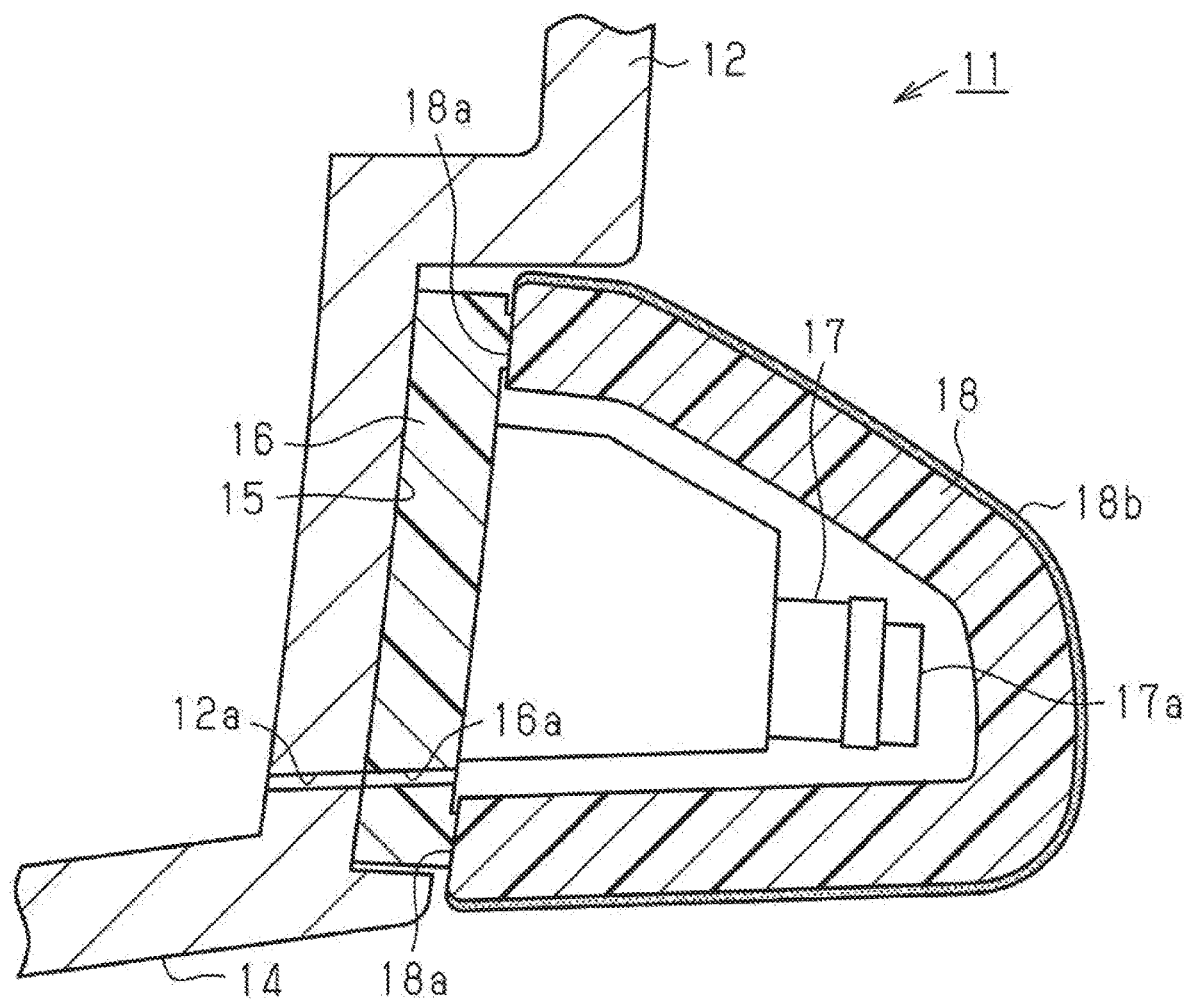
FIG. 2 is a cross-sectional view schematically illustrating a mounting structure of a camera.

As shown in FIGS. 1 and 2, a vehicle 11 includes a metallic back door 12, which is provided to be freely opened and closed, constituting an exterior component of the vehicle 11 in a rear part thereof. A first recessed part 14, which a number plate 13 is mounted, is formed in a central lower part on an external surface of the back door 12. A second recessed part 15 is formed to extend in a width direction of the vehicle 11 in a position adjacent to an upper side with respect to the first recessed part 14 on the external surface of the back door 12.

A base member 16 having a rectangular flat plate shape that constitutes the exterior component of the vehicle 11 is fixed on a bottom surface of the second recessed part 15. A camera 17 for capturing an image of a rear view of the vehicle 11, which is one of surrounding views of the vehicle 11, and a decorative member 18 are mounted on the base member 16. That is, the mounting structure of the camera 17 in the vehicle 11 according to the exemplary embodiment includes the base member 16, the camera 17, and the decorative member 18.

The camera 17 is provided with a lens 17a on a tip end part thereof. All of the base member 16 and the decorative member 18 are constituted by a synthetic resin. The decorative member 18 is formed of a bottomed box shape having an approximately U-shape in a cross-sectional view. Further, the decorative member 18 is joined to the base member 16 in such a manner that an end edge part 18a of the decorative member closely contacts the base member 16 in a state of covering the camera 17.

Accordingly, the camera 17 is disposed in a closed space surrounded by the base member 16 and the decorative member 18, that is, disposed in a region of an inside of the decorative member 18. Further, the end edge part 18a of the decorative member 18 may be welded to the base member 16, bonded thereto by an adhesive, or bonded thereto by a double-side adhesive tape.

The decorative member 18 is constituted by a transparent synthetic resin such as an acrylic resin (PMMA) and a polycarbonate (PC). A half-plated layer 18b having transmittance ranging from about 30% to 50% is formed on the overall external surface of the decorative member 18. Therefore, the decorative member 18 is a lustrous product that looks like a mirror when viewed from the external surface. Further, the decorative member 18 covers the camera 17 in such a manner that the camera 17 disposed in the inside thereof is not disturbed to image an image of an outside of the decorative member 18. That is, the decorative member 18 is a half-mirror structure.

In the back door 12, a first communication hole 12a forming a communication hole is formed to penetrate the back door 12. In the base member 16, a second communication hole 16a forming a communication hole is formed to penetrate the base member 16. The first communication hole 12a and the second communication hole 16a are communicated with each other. Accordingly, a region (inside a vehicle) of an inside of the back door 12 and a region of an inside of the decorative member 18 are communicated with each other through the first communication hole 12a and the second communication hole 16a.

Next, an action of the mounting structure of the camera 17, formed as described above, will now be described.

As shown in FIG. 2, with respect to the mounting structure of the camera 17 in the vehicle 11 according to the exemplary embodiment, the camera 17 does not protrude toward the outside of the decorative member 18, and is completely covered by the decorative member 18 having the half-mirror structure. Accordingly, the camera 17 is not seen from the outside of the decorative member 18, and the camera 17 disposed in the inside of the decorative member 18 performs capturing the image of the outside of the decorative member 18. Therefore, it is advantageously possible to prevent deterioration of design characteristics of an exterior of the vehicle 11 caused by the camera 17.

Further, even in a case where the vehicle 11 is exposed to water such as rainwater, and the like, since the decorative member 18 closely contacts the base member 16, it is possible to prevent outside water from a gap between the base member 16 and the decorative member 18 from entering into the inside of the decorative member 18. Therefore, the camera 17 is prevented from being wet with the water. Accordingly, since the camera 17 is not required to be provided with a waterproof function, the camera 17 can be smaller than a camera having the waterproof function.

Further, since the region (inside the vehicle) of the inside of the back door 12 and the region of the inside of the decorative member 18 are communicated with each other through the first communication hole 12a and the second communication hole 16a, air in the region of the inside of the back door 12 and air in the region of the inside of the decorative member 18 come and go through the first communication hole 12a and the second communication hole 16a. Therefore, since air permeability in the region of the inside of the decorative member 18, in which the camera 17 is disposed, is secured, the lens 17a of the camera 17 can be prevented from being cloudy.

According to the exemplary embodiment fully described above, effects are performed as described hereinafter.

(1) The decorative member 18 closely contacts the base member 16, and the camera 17 is disposed in the region of the inside of the decorative member 18. Accordingly, since the camera 17 does not protrude toward the outside of the decorative member 18, it is advantageously possible to prevent the design characteristics of the exterior of the vehicle 11 from deteriorating. Further, the decorative member 18 closely contacts the base member 16. Accordingly, since the outside water from the gap between the base member 16 and the decorative member 18 can be prevented from entering into the inside of the decorative member 18, the camera 17 can be prevented from being wet. Therefore, it is advantageously possible not only to prevent the design characteristics of the exterior of the vehicle 11 from deteriorating, but also to prevent the camera 17 covered by the decorative member 18 from being wet. Additionally, since the camera 17 can be prevented from being wet such that the camera 17 is not required to be provided with the waterproof function, the camera 17 can be miniaturized.

(2) The camera 17 is disposed in the inside of the decorative member 18, and the decorative member 18 is formed to be the half-mirror structure. Accordingly, it is possible not only to image the image of the outside of the decorative member 18 by using the camera 17, but also to prevent the camera 17 from being seen from the outside.

(3) The inside of the back door 12 and the inside of the decorative member 18 are communicated with each other through the first communication hole 12*a* and the second communication hole 16*a*. Accordingly, since the air permeability in the region of the inside of the decorative member 18 can be secured, the lens 17*a* of the camera 17 can be prevented from being cloudy.

Further, the above-mentioned exemplary embodiments may be modified as described hereinafter.

Figure 3:
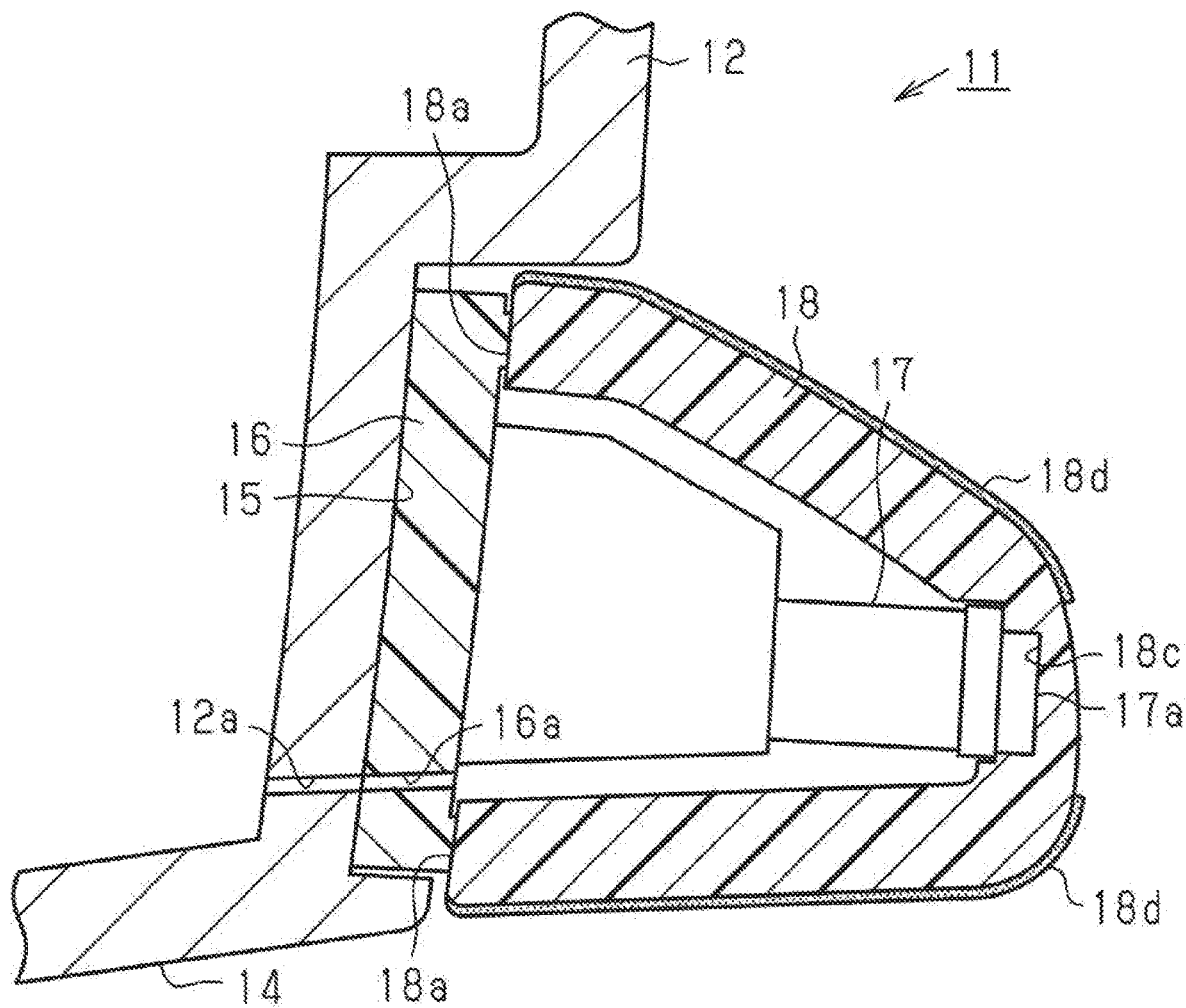
FIG. 3 is a cross-sectional view schematically illustrating a mounting structure of a camera according to a first modified embodiment.

As shown in FIG. 3, the tip end part in which the lens 17*a* is disposed in the camera 17 is fitted into a recessed part 18*c* that is formed on the internal surface of the decorative member 18, and a plated layer 18*d* may be formed on a portion other than a portion corresponding to a viewing range of the camera 17 on the external surface of the decorative member 18, instead of adopting the half-plated layer 18*b*. In this case, the portion corresponding to the viewing rang of the camera 17 in the decorative member 18 is formed to be thin only in the recessed part 18*c*. Further, in this case, the portion corresponding to the viewing rang of the camera 17 in the decorative member 18 is not formed to have the plated layer 18*d* on the external surface, but formed to be transparent thereon. However, when it is possible to image the image of the outside of the decorative member 18 by using the camera 17, the portion may be formed to be translucent. Accordingly, the tip end part of the camera 17 can be supported by the decorative member 18. Additionally, the first communication hole 12*a* and the second communication hole 16*a* may be omitted.

Figure 4:
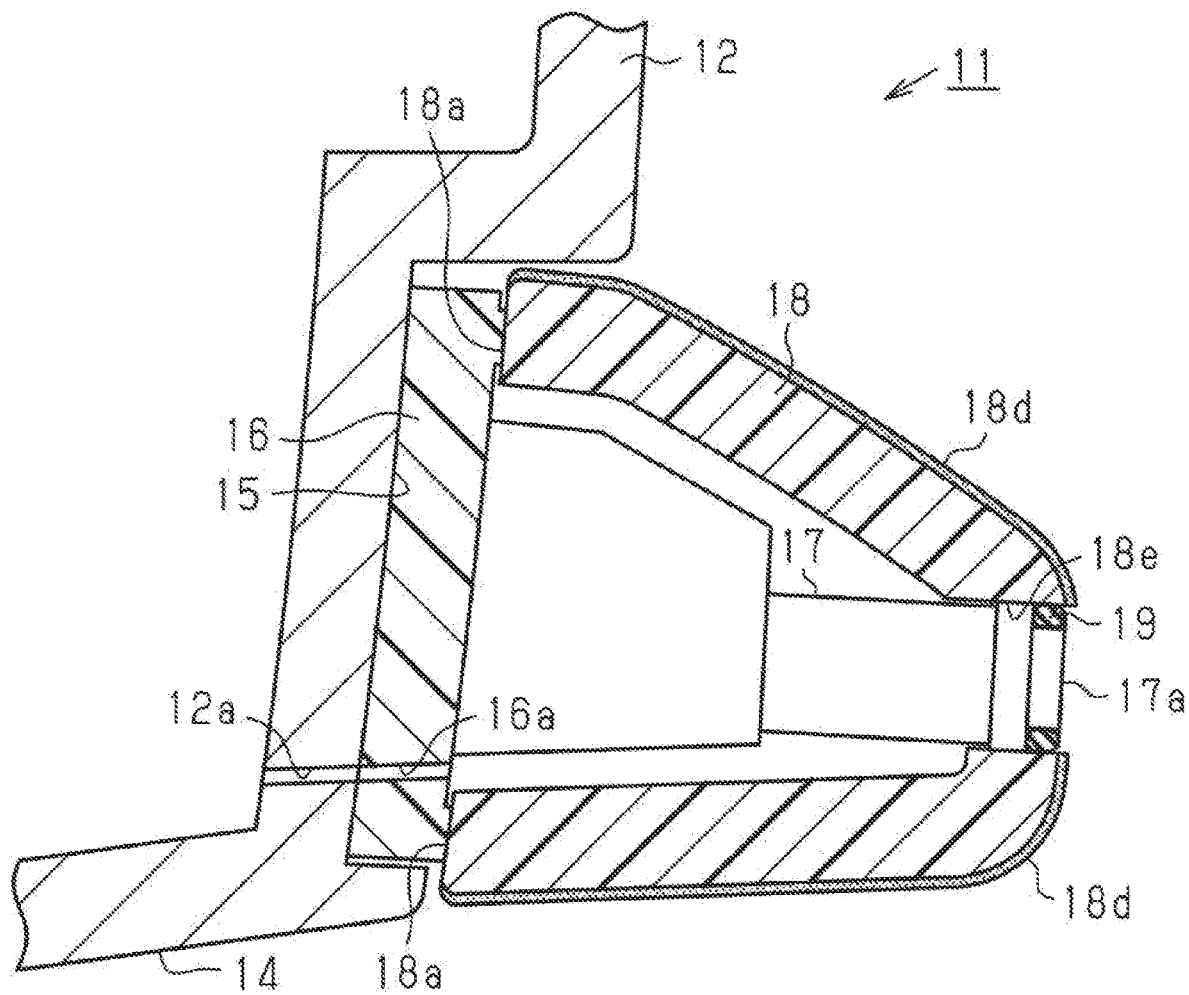
FIG. 4 is a cross-sectional view schematically illustrating a mounting structure of a camera according to a second modified embodiment.

As shown in FIG. 4, the tip end part in which the lens 17*a* is disposed in the camera 17 is fitted into a through hole 18*e* formed in the decorative member 18 through a seal member 19 such as an O-ring, and the like, and the plated layer 18*d* may be formed on a portion other than the through hole 18*e* on the external surface of the decorative member 18, instead of adopting the half-plated layer 18*b*. In this case, an external surface of the lens 17*a* of the camera 17 is flush with the external surface of the decorative member 18. Accordingly a portion other than the lens 17*a* in the camera 17 can be prevented from being wet with water such as rainwater, and it is advantageously possible to clearly image the image of the outside of the decorative member 18 by using the camera 17. Further, a synthetic resin material, by which the decorative member 18 is constituted, may be opaque, and the first communication hole 12*a* and the second communication hole 16*a* may be omitted.

Figure 5:
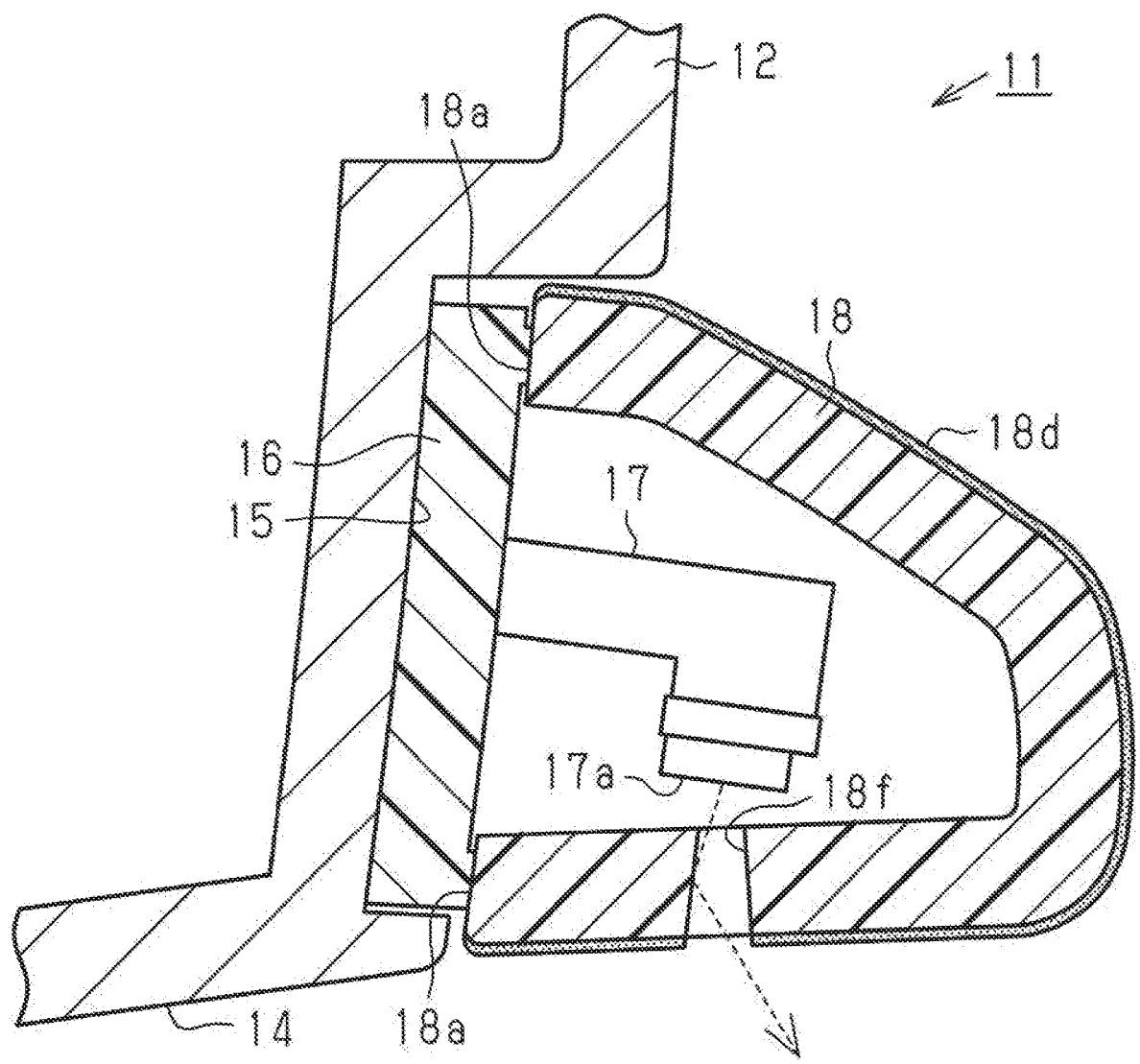
FIG. 5 is a cross-sectional view schematically illustrating a mounting structure of a camera according to a third modified embodiment.

As shown in FIG. 5, the tip end part of the camera 17 is bent in a downward direction and thus the lens 17*a* is directed in the downward direction, and a lower-side through hole 18*f* is formed in a position opposite to the lens 17*a* in the decorative member 18. Further, the plated layer 18*d* may be formed on a portion other than the lower-side through hole 18*f* on the external surface of the decorative member 18, instead of adopting the half-plated layer 18*b*. In this case, an internal surface of the lower-side through hole 18*f* is constituted by a mirror, such that the camera 17 images the image of the outside of the decorative member 18 (a downward direction of the vehicle 11) through the mirror. Additionally, the first communication hole 12*a* and the second communication hole 16*a* may be omitted.

Figure 6:
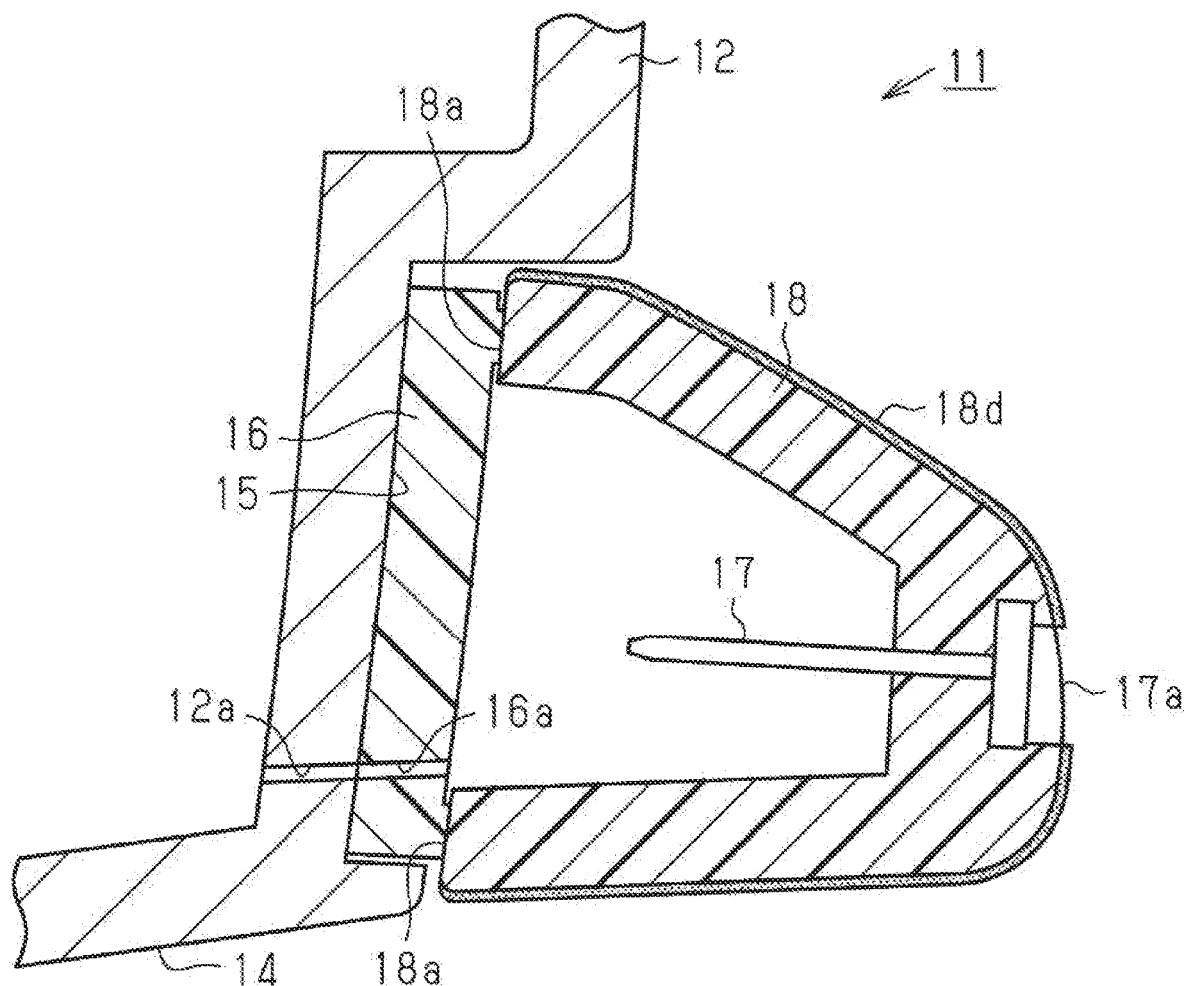
FIG. 6 is a cross-sectional view schematically illustrating a mounting structure of a camera according to a fourth modified embodiment.

As shown in FIG. 6, the camera 17 may be integrally formed with the decorative member 18 by insert molding in such a manner that the external surface of the lens 17*a* of the camera 17 is flush with the external surface of the decorative member 18, and the plated layer 18*d* may be formed on a portion other than an exposed portion of the lens 17*a* on the external surface of the decorative member 18, instead of adopting the half-plated layer 18*b*. Further, the first communication hole 12*a* and the second communication hole 16*a* may be omitted.

The first communication hole 12*a* and the second communication hole 16*a* may be omitted.

The decorative member 18 is not necessarily required to be a half-mirror structure.

The camera 17 may be supported not by the base member 16, but by the decorative member 18.

An arrangement position of the camera 17 may be desirably modified to image images of a front view and a side view of the vehicle 11 with respect to the surroundings of the vehicle 11.

The base member 16 may be omitted.

What is claimed is:

1. A mounting structure of a camera, comprising:
   a camera configured to capture an image corresponding to at least a part of surroundings of a vehicle; and
   a decorative member configured to be mounted on an exterior component of the vehicle and to cover the camera, wherein:
   the decorative member and the exterior component are fixed and closely contacted with each other, and the decorative member covers the camera in such a manner that the camera is not disturbed when capturing the image; and
   the camera is disposed in a region of an inside of the decorative member from an external surface of the decorative member;
   the camera is disposed in the inside of the decorative member; and the decorative member is a half-mirror structure;
   a tip end part in which a lens is disposed in the camera is fitted into a recessed part formed on an internal surface of the decorative member;
   a portion corresponding to a viewing range of the camera in the decorative member is transparent or translucent; and
   the decorative member is bonded to the exterior component to prevent water from entering the region inside the decorative member, which is occupied by the camera.

2. The mounting structure of the camera according to claim 1, wherein:
   the tip end part in which the lens is disposed in the camera is fitted into a through hole formed in the decorative member through a seal member; and an external surface of the lens is flush with the external surface of the decorative member.

3. The mounting structure of the camera according to claim 1, wherein the exterior component is formed with a communication hole through which an inside of the exterior component and the inside of the decorative member are communicated with each other.

4. The mounting structure of the camera according to claim 1, wherein the exterior component is formed with a communication hole through which an inside of the exterior component and the inside of the decorative member are communicated with each other.

5. The mounting structure of the camera according to claim 1, wherein the exterior component is formed with a communication hole through which an inside of the exterior component and the inside of the decorative member are communicated with each other.

6. The mounting structure of the camera according to claim 2, wherein the exterior component is formed with a communication hole through which an inside of the exterior component and the inside of the decorative member are communicated with each other.

7. The mounting structure of the camera according to claim 1, wherein the decorative member and the camera are fixed to the exterior component such that the camera is a fixed distance from an interior surface of the decorative component.

8. The mounting structure of the camera according to claim 1, wherein the close contact between the decorative member and the exterior component is fixed so that water is prevented from entering the region inside the decorative member, which is occupied by the camera.

* * * * *